United States Patent Office 3,640,899
Patented Feb. 8, 1972

3,640,899
REACTION PRODUCT OF HYDROCARBYLMONO-LITHIUM AND 1,3-BUTADIENE AS POLYMERIZATION INITIATOR
Floyd E. Naylor, Bartlesville, Okla., assignor to Phillips Petroleum Company
No Drawing. Filed Jan. 30, 1969, Ser. No. 795,365
Int. Cl. C08d 3/06
U.S. Cl. 252—431 R
3 Claims

ABSTRACT OF THE DISCLOSURE

Sec- or tert-organomonolithium compounds are reacted with 1,3-butadiene in the absence of added polar material to produce a multifunctional polymerization initiator.

---

This invention relates to a multifunctional polymerization initiator which forms as a reaction product resulting from the reaction of 1,3-butadiene and a sec- or tert-organomonolithium compound. In another aspect this invention relates to a polymerization process employing dilithium polymerization inititors. In another aspect this invention relates to a process for polymerizing isoprene to a high cis-polyisoprene. In still another aspect it relates to a process for polymerizing conjugated dienes and mono - vinyl substituted - aromatic compounds, and mixtures thereof.

Dilithium and monolithium polymerization initiators are well known to the art. Many of these, however, require polar diluents for their preparation and they are often sufficiently unstable that they cannot be prepared and subsequently stored for very long without a loss in the initiator activity. Also insoluble initiators prepared in polar materials, even after repeated washings, may contain residual polar material that can be undesirable in subsequent polymerization processes. Block copolymers of butadiene-styrene prepared by many of the well known lithium initiators often exhibit low green tensile strengths.

It has now been discovered that a multifunctional polymerization initiator can be formed by reacting from 2 to 4 moles of a sec- or tert-organomonolithium compound with one mole of 1,3-butadiene in the absence of added polar material. The multifunctional polymerization initiators thus formed possess surprising versatile properties.

The multifunctional initiators produced according to this invention contain at least about two lithium atoms per molecule and are particularly suited for the polymerization of isoprene to a high cis-polyisoprene. Block copolymers produced from styrene and butadiene exhibit high green tensile strengths when made according to this invention.

It is an object of this invention to provide a new multilithium based initiator. It is another object of this invention to provide a process for the polymerization of conjugated dienes and monovinyl-substituted aromatic compounds and mixtures thereof. Other advantages and features of my invention will be apparent to those skilled in the art from the following discussion and examples herein set forth.

According to my invention from 2 to 4 moles of a sec- or tert-organomonolithium compound are reacted with one mole of 1,3-butadiene in the absence of added polar material. The reaction can be conducted in the presence or absence of an inert hydrocarbon diluent. The presence of an inert hydrocarbon diluent is preferred. Suitable diluents include aliphatic, cycloaliphatic and aromatic hydrocarbons. Aliphatic and cycloaliphatic hydrocarbons containing from 4 to 10 carbon atoms per molecule are preferred.

Exemplary of some suitable diluents, if employed, are butane, pentane, hexane, heptane, decane, cyclohexane, 1,2 - dimethylcyclooctane, benzene, toluene, and the like and mixtures thereof. The amount of diluent that can be employed can vary over a wide range and can be conveniently described in terms of molar concentration for the organomonolithium compound. This concentration can vary from 0.1 molar to that obtained in the absence of diluent while the preferred range is from 1 molar to 4 molar.

The organomonolithium, preferably hydrocarbylmonolithium, compounds that can be employed in accordance with this invention can be represented by the general formula RLi wherein R is a sec- or tert-alkyl, cycloalkyl, or arylalkyl hydrocarbon radical, or combinations thereof, containing from 3 to 12 carbon atoms per molecule. Exemplary monolithium compounds that can be employed are isopropyllithium, sec-butyllithium, tert-butyllithium, cyclohexyllithium, cyclopentyllithium, 4 - phenylcyclohexyllithium, cyclopropyllithium, cyclooctyllithium, 1-methylcyclohexyllithium, 3,5 - diethyl - 3 - octyllithium, 4 - methyl - 2 - pentyllithium, 3 - phenyl-2-hexyllithium, and the like. n-Butyllithium has been found not acceptable in forming the multifunctional initiators according to this invention.

The temperatures employed for reacting the organomonolithium compound with 1,3-butadiene can vary from about 0° to 150° C. It is preferred however to react the compounds at a temperature from about 30° to 100° C. The pressure can also vary over a wide range. It is preferred, however, that the pressure be sufficient to maintain the reaction mixture in a predominantly liquid form. The time employed for the reaction can vary over a broad range and will generally depend upon the temperature and concentration of the reactants employed. The range of time can be from about 10 seconds to 72 hours while the preferred range is from 0.25 to 6 hours.

Multifunctional initiators prepared according to this invention are essentially insoluble in the inert hydrocarbon reaction medium, if one is employed. The insolubility of the initiator is a feature that can be an advantage in that these initiators can be essentially freed of excess reactants by simple decantation. These insoluble components can thus be washed with inert hydrocarbon and redispersed in an inert diluent for use in polymerization runs.

Gas chromatography, mass spectrometer and mass digitizer analysis has shown that the initiators produced according to this invention contain at least about two lithium atoms per molecule of initiator. These lithium substituents serve as reactive sites for polymerization at multiple positions.

Various polymers can be prepared using initiators of this invention as hereinbefore stated. Homopolymers of conjugated dienes and copolymers of two or more conjugated dienes, homopolymers of monovinyl-substituted aromatic compounds, copolymers of two or more monovinyl-substituted aromatic compounds and copolymers of conjugated dienes with monovinyl-substituted aromatic compounds can be prepared. Conjugated dienes having from 4 to 12 carbon atoms per molecule and monovinyl-substituted aromatic compounds containing from 8 to 24 carbon atoms per molecule are preferred. Said mixtures of conjugated dienes with monovinyl-substituted aromatic compounds can be employed at any ratio of the conjugated diene monomer to the monovinyl-substituted aromatic monomer. Said mixtures of conjugated dienes with said monovinyl-substituted aromatic compounds can be polymerized by contacting the entire mixture with the initiators of this invention or each of the separate monomers can be added and polymerized essentially to completion prior to the addition of the subsequent monomer. Any desired sequence of addition can be employed in the latter procedure. Examples of suitable monomers for use according to this invention include 1,3 - butadiene, isoprene, 1,3 - pentadiene, 1,3-dodecadiene, styrene, 1 - vinylnaphthalene, 4 - methylstyrene, 4 - vinylpyridine, and the like. As hereinbefore stated, the multifunctional initiators of this invention are particularly suited for the polymerization of isoprene to a high cis-polyisoprene. In the polymerization of isoprene, various modifiers known in the art can also be employed if desired when the multifunctional initiators of this invention are employed. U.S. Pat. 3,278,508, Oct. 11, 1966, issued to Kahle et al. and U.S. Pat. 3,312,680, Apr. 4, 1967, issued to Kahle, disclose suitable modifiers.

Polymerization conditions generally known to the art can be suitably employed. The polymerization temperature can vary over a broad range and is generally from about −70 to 150° C.; it is preferred to operate at a temperature in the range of about 30° C. and above.

It is also preferred that the polymerization be conducted in the presence of an inert diluent, such as those described for employment in the initiator preparation process.

The polymerization process can also be conducted in the presence of added polar compounds such as amines, ethers, and the like, if desired. The amount of polar compound employed can vary over a wide range, but will generally be in the range of about .01 to 100 parts of polar compound per 100 parts of monomer employed.

The amount of multifunctional initiator to be employed in the polymerization process ranges from about 0.25 to 200, preferably 1 to 100 milliequivalents of lithium per 100 grams of monomers (meqhm.). The milliequivalents of lithium can be conveniently determined by an alkalinity titration of a known volume of reaction mixture containing the multifunctional initiator. Said alkalinity titration employs standardized acid, e.g., HCl, and an indicator such as phenolphthalein to determine the end-point of the titration. The alkaline normality thus obtained provides a value for the milliequivalents of lithium per milliliter of reaction mixture containing the multifunctional initiator.

The alkalinity concentration (normality) thus determined is then employed for charging a known quantity of milliequivalents of lithium in polymerization recipes employing the multifunctional initiator of this invention.

The polymers prepared with the initiators of this invention can be employed in the manufacture of automobile tires, tubing, belting, gaskets, shoe soles, containers and the like. They can also be compounded with known curing agents, fillers, plasticizers, antioxidants, stabilizers, and the like.

Illustrative of the foregoing discussion and not to be interpreted as a limitation on the materials herein employed, or on the scope of my invention the following examples are herein provided.

EXAMPLE I

A multifunctional initiator was prepared employing the following initiator preparation recipe:

| | Parts by weight |
|---|---|
| Cyclohexane | 175 |
| Butadiene | 100 |
| sec-Butyllithium | 237 |
| Temperature, ° C. | 70 |
| Time, hours | 2 |

A solution of sec-butyllithium in cyclohexane (about 1.5 M) was charged to the reactor first followed by the addition of 1,3-butadiene. At the end of the reaction period cyclohexane was removed from the insoluble initiator and was replaced by an equal volume of dry n-hexane. This dispersion of initiator in n-hexane was then employed for the polymerization of isoprene according to the following polymerization recipe:

| | Parts by weight |
|---|---|
| Isoprene | 100 |
| Cyclohexane | 790 |
| Initiator | variable |
| Modifier (n-butylbromide) | variable |
| Temperature, ° C. | 70 |
| Time, hours | 6 |

Cyclohexane was charged to the reactor first followed by a nitrogen purge. Isoprene was added next followed by the initiator dispersion. The temperature was then adjusted to 70° C. for the reaction period. In runs 1 and 2 the modifier was added after evidence of polymerization was noted by an increase of the mixture viscosity, i.e., after 2–4 hours. At the end of the reaction period, each polymerization mixture was terminated by the addition of a 10 weight percent solution of 2,2′-methylene-bis(4-methyl-6-tert-butylphenol) in a 50/50 by volume mixture by isopropyl alcohol/toluene. The amount of this antioxidant solution added was sufficient to provide one part of the antioxidant per 100 parts of polymer. Each terminated mixture was stirred with isopropyl alcohol to precipitate the polymer and the polymer from each run was separated and dried. The results of these polymerization runs are reported in Table I. These results demonstrate that the initiator of this invention can be employed for the polymerization of isoprene to form a high cis-polymer and that modifiers can be employed to regulate the polymer molecular weight.

TABLE I

| Run No. | Modifier, meqhm.[1] | Modifier, mhm.[2] | Conv., percent | I.V.[3] | Unsaturation,[4] percent | | H.I.[5] |
|---|---|---|---|---|---|---|---|
| | | | | | Cis | 3,4 | |
| 1 | 1.50 | 0.50 | 100 | 6.95 | | | 2.7 |
| 2 | 1.75 | 0.50 | 100 | 6.60 | | | 2.7 |
| 3 | 2.75 | 0 | 100 | 9.01 | | | 2.0 |
| 4 | 1.75 | 0 | 100 | 6.97 | 90 | 4.7 | 5.5 |

[1] Milliequivalents of lithium expressed in terms of sec-butyllithium per 100 grams of monomer.
[2] Gram millimoles per 100 grams of monomer.
[3] Determined as described in U.S. Patent 3,215,679. Note (B), column 11.
[4] Microstructure determined as described in U.S. Patent 3,215,679. Note (A), column 11.
[5] Heterogeneity index.

EXAMPLE II

Isoprene was polymerized with an initiator prepared according to initiator preparation recipe of Example I. The initiator was employed for the polymerization of isoprene according to the following polymerization recipe:

| | |
|---|---|
| Cyclohexane, parts by weight | 790 |
| Isoprene, parts by weight | 100 |
| Initiator, meqhm. | 1.4 |
| Tetraallyltin (modifier) mhm. | 0.1 |
| Temperature, ° C. | 70 |
| Time, hours | 6 |
| Conversion, percent | 100 |

In this run cyclohexane was charged to the reactor first followed by a nitrogen purge. Isoprene was added next followed by the tetraallyltin and then the initiator dispersion. Polymerization was terminated and the polymer isolated as described in Example I. The raw polyisoprene contained 85 percent unsaturation in the cis-1,4 configuration and 6.0 percent in the 3,4-configuration. The polymer possessed an inherent viscosity of 5.14, and a Mooney viscosity, ML-4 at 212° F., of 76 and was gel-free. The polyisoprene was then compounded employing the following tire tread stock recipe:

Compounding recipe

| | Parts, by weight |
|---|---|
| Polyisoprene | 100 |
| IRB #2 [a] | 50 |
| Zinc oxide | 3 |
| Stearic acid | 3 |
| Flexamine [b] | 1 |
| Flexzone 3C [c] | 2 |
| Philrich 5 [d] | 5 |
| Vultrol [e] | 1 |
| Sulfur | 2.25 |
| NOBS Special [f] | 0.65 |

[a] High abrasion furnace type carbon black.
[b] Mixture containing 65% of a complex diarylamine-keton reaction product and 35% of N,N'-diphenyl-p-phenylenediamine.
[c] N-isopropyl-N'-phenyl-p-phenylenediamine.
[d] Highly aromatic oil, Type 101 of ASTM D2226–63T.
[e] N-nitrosodiphenylamine.
[f] N-oxydiethylene-2-benzothiazolesulfenamide.

TABLE II

Processing data (BR—Banbury mixer)

| | |
|---|---|
| Mixing time, minutes | 6.5 |
| Dump temperature, ° F. | 300 |
| Compounded Mooney (ML-4 @ 212° F.) [a] | 66 |
| Extrusions @ 250° F., Garvey Die [b] | |
| inches/minute | 70 |
| grams/minute | 118 |
| Rating (3 to 12) | 6 |
| Hand tack (0 to 10) | 8 |
| Dispersion, Cured (0 to 10) | 5 |

Physical properties (Cured 30 minutes at 293° F.)

| | |
|---|---|
| 300% Modulus, p.s.i. [c] | 1290 |
| Tensile, p.s.i. [c] | 3580 |
| Elongation, percent [c] | 630 |
| Max. Tensile @ 200° F., p.s.i. | 1880 |
| $\Delta T$, ° F. [d] | 45 |
| Resilience, percent [e] | 72 |
| Shore A Hardness [f] | 62 |

[a] ASTM D1646–63.
[b] Ind. Eng. Chem., 34, 1939 (1942).
[c] ASTM D412–62T.
[d] ASTM D623–62.
[e] ASTM D945–59.
[f] ASTM D1706–61.

The results in Table II of Example II demonstrate that a tread stock compound with good properties was prepared from a polyisoprene initiated with a multifunctional initiator of this invention.

EXAMPLE III

The initiator of Example I of this invention was employed for the preparation of butadiene/styrene block copolymers having high green tensile strength. The block copolymers were prepared according to the following polymerization recipe:

Polymerization recipe

| | |
|---|---|
| 1,3-Butadiene, parts by weight | 60 |
| Styrene, parts by weight | 40 |
| Cyclohexane, parts by weight | 790 |
| Tetrahydrofuran (THF), parts by weight | variable |
| Initiator, meqhm. | 5.0 |
| Temperature, ° C. | 70 |
| Time, hours | |
| Butadiene polymerization | variable |
| Styrene polymerization | 1 |

In these runs cyclohexane was charged to each reactor first followed by a nitrogen purge. Butadiene was added next then THF and the initiator. The temperature was adjusted to 70° C. and the butadiene polymerized for the desired time period. Styrene was then added and polymerized at 70° C. for 1 hour. Each of the polymerizations were terminated and the polymers isolated as described in Example I. The polymerization results and polymer properties are shown in Table III.

TABLE III

| Run No. | THF, phm.[2] | Bd Pzn.,[1] time, hours | Conv., percent | I.V.[3] | Green tensile, p.s.i.[4] | Elongation, percent[4] |
|---|---|---|---|---|---|---|
| 1 | 1.0 | 2.0 | 100 | 2.10 | 3,130 | 1,250 |
| 2 | 2.0 | 1.5 | 100 | 2.17 | 2,910 | 1,350 |
| 3 | 3.0 | 1.0 | 100 | 2.01 | 2,740 | 1,000 |

[1] 1,3-butadiene polymerization.
[2] Parts by weight per 100 parts by weight of monomers.
[3] Inherent viscosity. All polymers were gel-free.
[4] ASTM D 412–62T.

The results shown above demonstrate that block copolymers of high green tensile strength were prepared by the use of an initiator of this invention. High green tensile strength is a result of terminal styrene blocks in such polymers. Block polymers of butadiene/styrene made under the same conditions with an organomonolithium initiator have green tensile strengths that are too low to measure. The high green tensile strengths shown above provide further demonstration that the initiators of this invention have at least two lithiums per molecule of initiator.

EXAMPLE IV

A sample of the initiator prepared in Example I was placed in a tube and the liquid phase removed under vacuum. The solid residue was hydrolyzed with excess deuterium oxide ($D_2O$). The hydrocarbon products of this hydrolysis were analyzed by a gas chromatograph—mass spectrometer—mass spectrum digitizer combination. This analysis revealed that the hydrocarbon product of the above hydrolysis contained 70% by weight of monoolefins having eight carbon atoms and 30% by weight of saturated hydrocarbons having 12 carbon atoms. Furthermore, the $C_8$ monoolefins contained on the average at least 1.7 deuterium atoms per molecule. Although the deuterium content of the $C_{12}$ hydrocarbons could not be determined in this analysis, this product was obviously derived from the addition of two moles of sec-butyllithium to one mole of 1,3-butadiene and thus would contain at least two lithiums per molecule of the $C_{12}$ reaction product. Since the $C_8$ monoolefins obtained on hydrolysis with $D_2O$ contained about two deuteriums per molecule, they were derived from compounds which also contained two lithiums per molecule. The $C_8$ product in the reaction of sec-butyllithium with 1,3-butadiene was apparently derived from the addition of one mole of sec-butyllithium to one mole of 1,3-butadiene followed by or subsequent to a metalation reaction in which a hydrogen of the 1,3-butadiene moiety was replaced by a lithium atom.

The results of the above analysis demonstrate that the initiators of this invention contained at least about two lithiums per molecule of initiator.

As will be evident to those skilled in the art, various modifications of this invention can be made or followed,

I claim:

1. An essentially hydrocarbon insoluble multifunctional polymerization initiator which forms on admixing components consisting essentially of a sec- or tert-hydrocarbylmonolithium compound containing from 3 to 12 carbon atoms per molecule and 1,3-butadiene wherein said admixing is in the absence of added polar material and wherein 2 to 4 moles of said hydrocarbylmonolithium compound are provided per mole of said 1,3-butadiene, and wherein said admixing is conducted at a temperature in the range of from about 0° C. to 150° C. in the presence of an inert hydrocarbon diluent at a sufficient pressure to maintain the reaction mixture in a predominately liquid form and wherein said components are allowed to react in the range of from about 10 seconds to 72 hours.

2. The multifunctional initiator of claim 1 wherein said hydrocarbylmonolithium compound is represented by the formula RLi wherein R is a sec- or tert-alkyl, cycloalkyl, or arylalkyl radical, or combinations thereof, and wherein about 2 moles of said hydrocarbylmonolithium compound are provided per mole of 1,3-butadiene.

3. The multifunctional initiator of claim 2 wherein said admixing of components is conducted at a temperature in the range of 30° to 100° C., said components are allowed to react in the range of about 0.25 to 6 hours, and wherein said hydrocarbylmonolithium compound is sec-butyllithium and said inert hydrocarbon diluent is cyclohexane.

References Cited
UNITED STATES PATENTS

| | | | |
|---|---|---|---|
| 3,157,604 | 11/1964 | Strobel | 252—431 |
| 3,377,404 | 4/1968 | Zelinski | 260—94.2 M X |
| 3,388,178 | 6/1968 | Kamienski et al. | 252—431 X |
| 3,392,202 | 7/1968 | Pritchett | 252—431 X |
| 3,452,111 | 6/1969 | Kamienski et al. | 252—431 X |
| 3,514,387 | 5/1970 | Farrar et al. | 260—94.2 M X |

PATRICK P. GARVIN, Primary Examiner

U.S. Cl. X.R.

260—94.2 M, 94.3